US012755757B2

(12) United States Patent
Liu et al.

(10) Patent No.: US 12,755,757 B2
(45) Date of Patent: Oct. 6, 2026

(54) SOLDER TACK BONDING OF HARD DISK DRIVE ACTUATOR ARM ASSEMBLIES

(71) Applicant: Seagate Technology LLC, Fremont, CA (US)

(72) Inventors: Xiong Liu, Singapore (SG); Lihong Zhang, Singapore (SG); Barish Chakravarty, Singapore (SG); Chee Yin Chan, Singapore (SG); Xiaolei Liao, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/061,615

(22) Filed: Feb. 24, 2025

(65) Prior Publication Data

US 2026/0253610 A1 Aug. 27, 2026

(51) Int. Cl.

| | |
|---|---|
| ***G11B 5/48*** | (2006.01) |
| ***B23K 1/00*** | (2006.01) |
| ***G11B 5/55*** | (2006.01) |
| *B23K 101/36* | (2006.01) |
| *G11B 5/00* | (2006.01) |

(52) U.S. Cl.

CPC .......... *G11B 5/5521* (2013.01); *B23K 1/0016* (2013.01); *B23K 2101/36* (2018.08); *G11B 2005/0021* (2013.01)

(58) Field of Classification Search

CPC ............................ G11B 5/4813; G11B 5/4833
USPC ...................................................... 360/265.9
See application file for complete search history.

(56) References Cited

U.S. PATENT DOCUMENTS

| | | | | |
|---|---|---|---|---|
| 6,765,763 | B2 * | 7/2004 | SeeToh .................. | G11B 5/486 360/245.9 |
| 8,416,535 | B2 * | 4/2013 | Korkowski .......... | G11B 5/4826 360/265.9 |
| 9,514,772 | B2 * | 12/2016 | Kawashima ......... | G11B 5/6005 |
| 10,373,635 | B2 | 8/2019 | Kikuchi | |
| 2015/0342263 | A1 | 12/2015 | Taylor et al. | |
| 2015/0356986 | A1 | 12/2015 | Pan | |

* cited by examiner

*Primary Examiner* — Nabil Z Hindi
(74) *Attorney, Agent, or Firm* — Mueting Raasch Group

(57) ABSTRACT

Described are actuator assemblies for use in hard disk drives (HDDs), and methods for making such actuator assemblies, in which solder tacks are used to fasten and secure the trace gimbal assembly (TGA) tail to the head stack arm assembly (HSA). Using one or more solder tacks as a mechanical connection rather than using conventional adhesives and epoxies can avoid undesired outgassing inside the HDD enclosure while also providing the ability for reworking the solder bond.

18 Claims, 3 Drawing Sheets

SOLDER TACK BONDING OF HARD DISK DRIVE ACTUATOR ARM ASSEMBLIES

The disclosure relates to actuator arm assemblies in hard disk drives.

SUMMARY

In accordance with certain aspects, the present disclosure provides actuator arm assemblies, actuator stacks that include the actuator arm assemblies, and hard disk drives that incorporate the actuator stacks, in which the actuator arm assemblies include a TGA tail fitted between upper and lower elements of the arm assembly and fastened by a solder material. In certain aspects, the actuator stack includes no adhesive or epoxy.

The solder material may be one that complies with RoHS (Restriction of Hazardous Substances), for example a high purity lead free solder alloy such as composed of x=3% to 4% of silver, y=0.5% to 0.7% of copper, and z=100%−(x+y) of tin.

In certain aspects, hard disk drives incorporating such actuator stacks include a sealed enclosure that may be filled with an inert gas. In certain aspects, such hard disk drives may be heat-assisted magnetic recording hard disk drives.

In accordance with certain aspects, the present disclosure provides methods for bonding a plurality of actuator arm assemblies in an actuator stack that may be used in a hard disk drive. Such methods include fitting a TGA tail between upper and lower elements of each arm assembly, applying a solder material to a gap between the upper and lower elements of the arm assembly, allowing the solder material to flow in a melted state, and allowing the solder material to cool and solidify, thereby forming a solder tack that bonds the TGA tail to the arm assembly.

In certain aspects, the solder material may be applied in a molten state or as an unmelted paste that is melted after application. In certain aspects, the solder tack may be inspected to determine whether reworking the solder tack is necessary.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
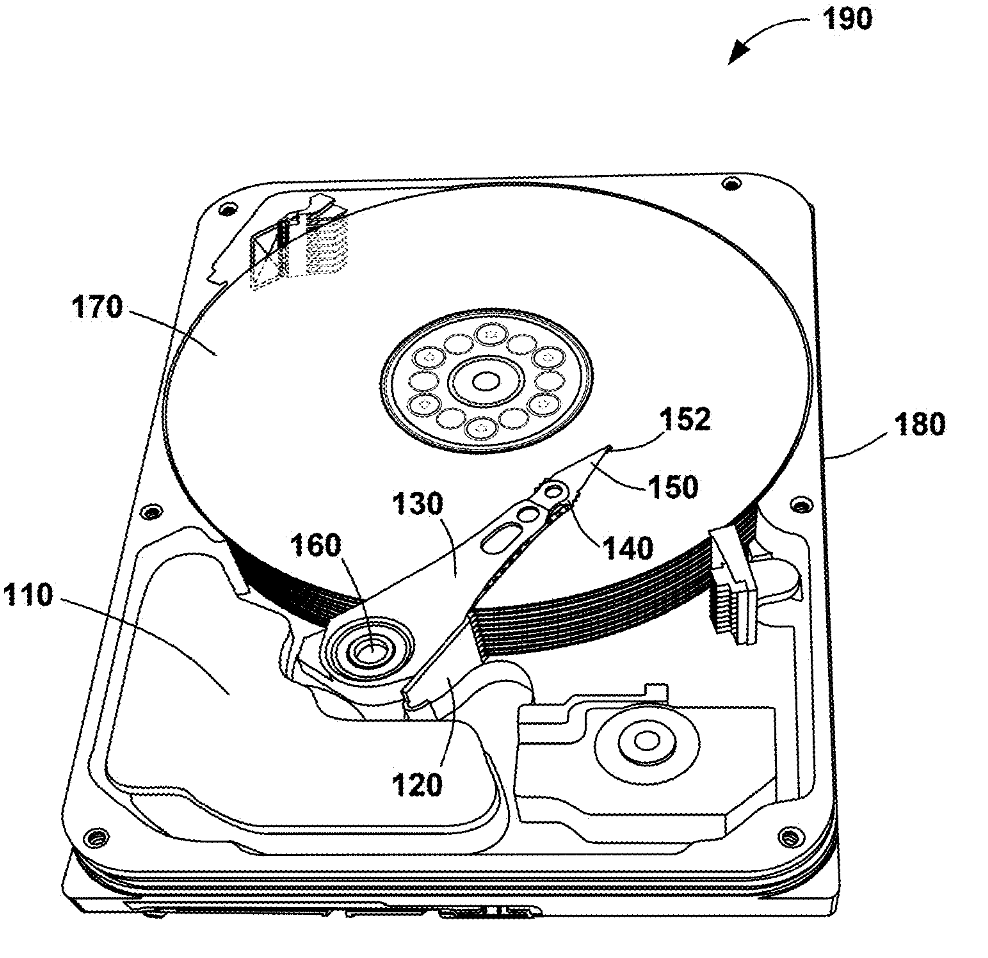
FIG. 1 is a schematic illustration of components of a hard disk drive that utilizes an actuator stack assembly in accordance with various aspects of the present disclosure.

The present disclosure relates to actuator assemblies in hard disk drives (HDDs), and in particular to securing the trace gimbal assembly (TGA) tail to the head stack arm assembly (HSA) using one or more solder beads as a mechanical connection rather than using conventional adhesives, epoxies, and the like. Adhesives such as acrylate-based adhesives generally include organic materials that can outgas inside an enclosed and controlled HDD environment, such as found in heat-assisted magnetic recording (HAMR) HDDs. Moreover, low-outgas bonding materials such as certain epoxies are difficult to rework and require extra processing steps. On the other hand, solder materials that are used to make electrical connections, while being re-workable and low outgassing, are not intended for making mechanical connections, particularly between surfaces that may be subject to stress or strain due to movement and vibration. Surprisingly, as is appreciated in accordance with the present disclosure, it has been found that TGA tails can be secured to HSA assemblies by using a solder tack in place of an adhesive or epoxy.

In an HDD storage device, the actuator arms formed from fitting TGA tails into HSA assemblies are in turn used to suspend and position recording heads over spinning magnetic media for the storage and retrieval of data. These actuator arm assemblies are subject to repetitive and abrupt back-and-forth motion, along with associated vibrations, and may further be subject to other sources of resonance/vibration internal and external to the HDD such as from jostling or jarring, or from vibrations from a rack that holds an array of HDDs. In such environments, it might be expected that solder tacks would be susceptible to cracking or other forms of weakening that may result in delamination of the actuator arm components. However, it has been found that TGA tails can be bonded to HSA assemblies using solder tacks as the only bonding materials, and thus without the use of any organic-based materials or adhesives. Surprisingly, the actuator assemblies so bonded remain sufficiently flexible, even under conditions where the solder material may reflow between surfaces of the assembly.

Solder has long been used in TGA-HSA assembly processes, and yet has not been used as a mechanical connection in the manner set forth in the present disclosure. The reflow soldering process is well-known in HDD manufacturing for making the TGA electrical connections (for example, to the TGA tail flexible print circuits and print circuit cables) during the head stack assembly. However, despite this long-standing use of soldering at the TGA level, it has not been attempted or appreciated to implement soldering to make mechanical connections that do not also function as electrical connections. As first recognized herein, the use of soldering for mechanical bonding outside of electrical connections simultaneously accomplishes the obviation of the need for adhesives that can outgas harmful organic materials, the improvement of reworkability of the mechanical bond, and the increased factory efficiency by using processes that are already implemented.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically shows the internal components of an example HDD 190.

The HDD housing includes a top cover and a base 180, with the top cover removed in FIG. 1 to show a stack of magnetic media disks 170 for storing data. The data can be written to and read from the media disks 170 using write and read transducers provided on a recording head that formed as part of a slider 152 that is positioned on the end of a suspension 150 that is the extension of a TGA tail 140 that attaches to the main part of the actuator arm 130. A stack of such actuator arms interleave with the media disks so that each media disk recording surface is accessible to a recording head. The actuator arms in the stack are attached at an actuator stack electrical and mechanical hub, or E-block, 120 that is rotatably coupled to a pivot 160. The recording heads are positioned over the media surface by rotating the actuator stack using a voice coil motor 110. In accordance with various aspects, the TGA tails may be secured to the actuator arm assemblies using solder tacks and without the use of any adhesive or epoxy. In certain embodiments, HDD 190 may be a sealed-enclosure HAMR hard drive that is filled primarily with an inert gas, which may be particularly susceptible to the outgassing of organic compounds.

Figure 2A:
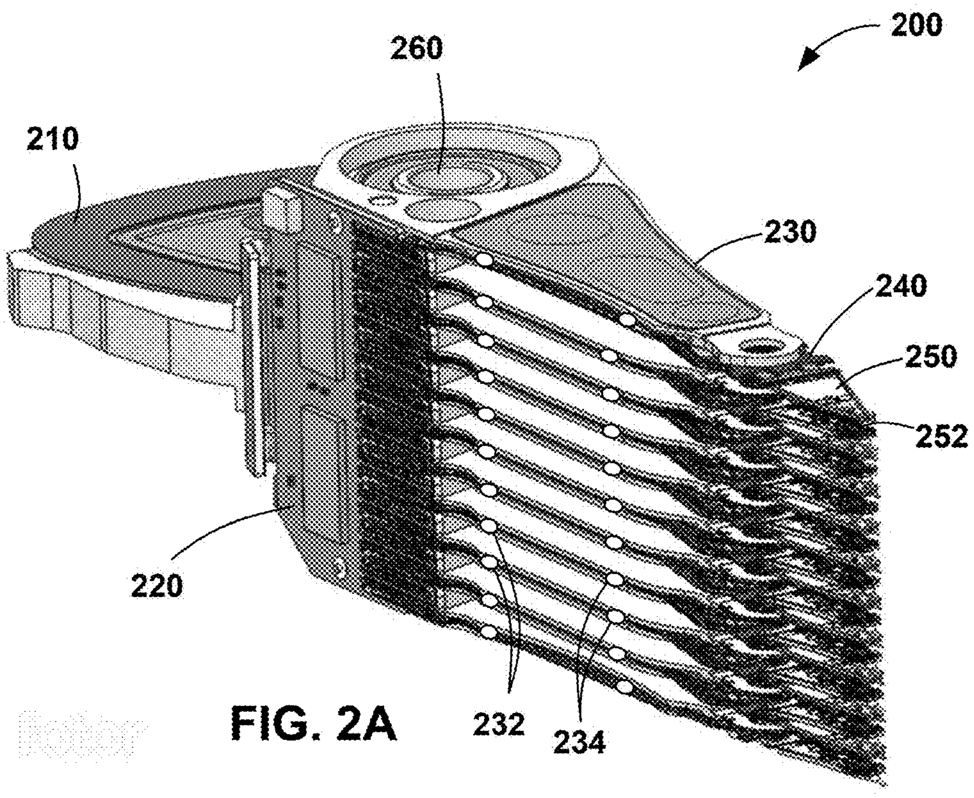
FIGS. 2A and 2B are schematic illustrations of an actuator stack assembly in accordance with various aspects of the present disclosure.
Figure 2B:
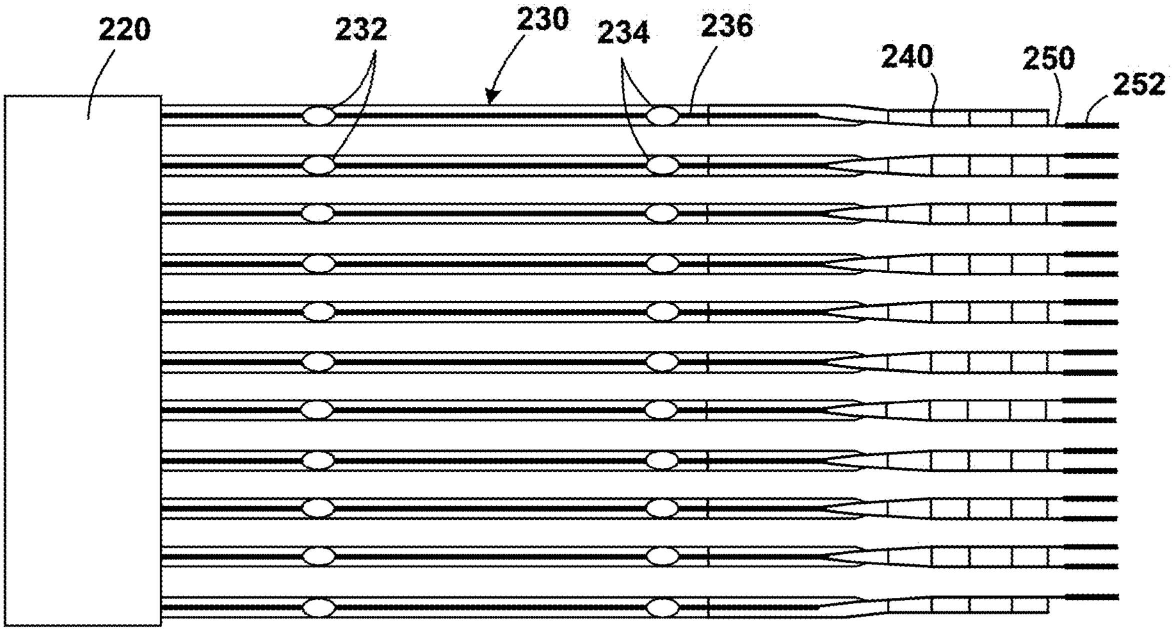

FIGS. 2A and 2B show a schematic perspective view and a schematic side view, respectively, of an actuator stack 200 that includes a plurality of actuator arm assemblies 230 attached to E-block 220 that is rotatable around a pivot 260 by operation of a voice coil 210 in the presence of voice coil magnets (not shown). Each actuator arm 230 includes a TGA tail 240 that attaches to the arm by being fit in a slot between upper and lower portions of the arm 230. The TGA tail 240 may be secured in place using a solder tack 234 positioned near the base of the TGA tail 240 and on the seam between the upper and lower portions of the arm 230. Solder tacks 234 help to mechanically attached the TGA tail 240 to the arm 230. It is not critical for solder tacks 234 to contact both the upper and lower portions of the arm 230, so long as the TGA tail is bonded to at least one side or the other. An additional solder tack 232 may optionally be used to bond the upper and lower portions of each arm, and may be placed at the opposite end of the arm 230 closer to the E-block 220. Such a use of solder tacks may replace the use of alkyl acrylate or acrylate ester-based adhesives, or other adhesives, that may outgas undesired compounds (such as amides or halogen-containing compounds) into the interior of the HDD. Such a use of solder tacks may also replace the use of low-outgassing epoxies that are difficult to rework.

A reflow soldering process may be used to "fasten" the TGA tail to the arm during head stack assembly. Accordingly, the solder is melted to flow into the gap of the slot in the arm into which the TGA tail is then fitted. In this way, the solder joins the TGA tail to one or both sides of the arm slot. A solder tack bond formed in this way is fully reworkable. By using a solder tack, outgas contamination inside an HDD can be reduced without introducing epoxies or other materials that require extra steps such as mixing or UV curing and/or that are not reworkable. Suitable solder materials, that is solder pastes and solder wires, may include RoHS-compliant lead-free solder alloys. Typical solder alloys are composed of: x=3% to 4% of silver, y=0.5% to 0.7% of copper, and z=100%−(x+y) of tin. For example, the solder paste and solder wire may include high purity lead free alloys such as SAC357 (composed of Sn 95.8%, Ag 3.5%, and Cu 0.7%), SAC305 (composed of Sn 96.5%, Ag 3.0%, and Cu 0.5%).

The solder tacks are typically formed on only one side of the actuator assembly, for example the side that faces the media disks. The solder tack locations along the actuator arms as indicated in FIGS. 2A and 2B are merely exemplary, and there is no fixed or precise location for the solder tacks. In certain embodiments where two solder tacks are used along each actuator arm, it may be convenient for the two tacks to be roughly located one third and two thirds, respectively, along the length of the actuator. Moreover, while FIGS. 2A and 2B appear to indicate that the solder tacks are vertically aligned, it is not necessary to align the solder tacks in a straight line. In other words, the solder tack location may be different for each actuator arm. In typical configurations, there is about a 2 mil to 6 mil gap between the TGA and the arm TGA slot. During flowing of the solder, the solder tack material fills the gap, which prevents the TGA from moving or vibrating in z-axis (that is, vertically on the page in FIG. 2B). It is not necessary for the tack material to cover both sides of the arm, and single side tacking is often acceptable.

Figure 3:
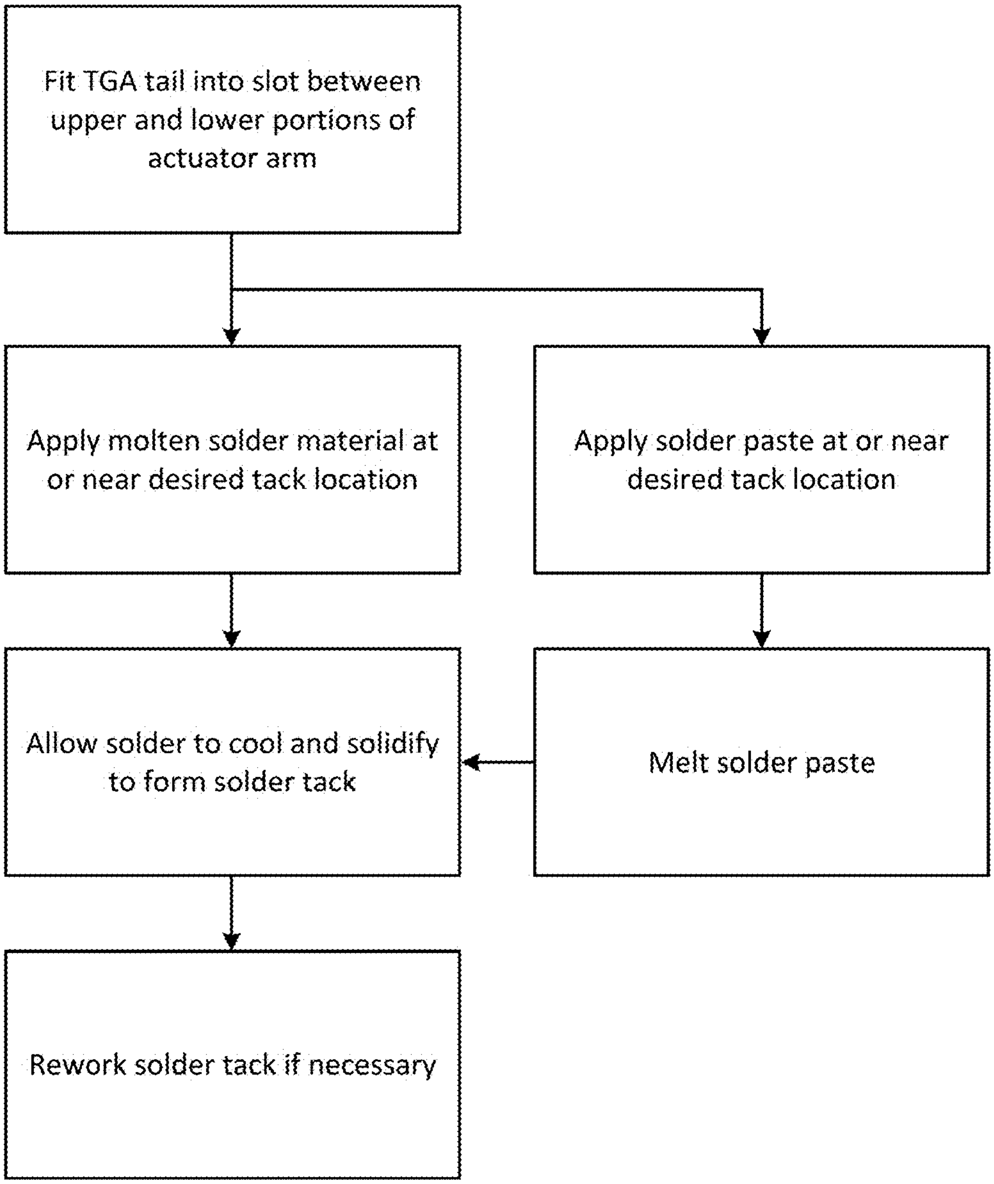
FIG. 3 is a flow chart showing steps that may be performed in accordance with aspects of the present disclosure.

FIG. 3 is a flow chart showing steps that may be performed in accordance with methods disclosed herein. When assembling an actuator arm assembly, the TGA tail is fit into the slot between upper and lower portions of the actuator arm. Solder material is applied at the desired tack location, either in a molten state or as a paste that is then melted after application. The molten or melted solder material can then flow into the gap between the upper and lower portions of the actuator arm in the vicinity of where the TGA tail is fitted. The fitting of the TGA tail and the flowing of the solder material can be done in either order, or even simultaneously. Optionally, solder tacks can be formed elsewhere along the actuator arm. After the solder tack(s) cool and solidify, inspection may reveal the need to rework the solder tasks, which can be accomplished by known solder reworking processes.

When applying the solder, there are different general approaches. In one approach, solder paste is applied at the desired tack location using a solder paste dispenser. Then, the solder paste is heated to a temperature sufficient for the solder paste to melt. A heating element such as a hot bar may be used. Removing the heat allows the solder to cool and solidify. In another approach, an automatic solder nozzle may be employed. In this case, a nozzle is used to apply molten solder paste to the desired tack location. No additional heating elements are needed since the solder is already molten. After application, the molten solder pastes cools and solidifies.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A hard disk drive comprising:

an actuator stack comprising a plurality of actuator arm assemblies, each actuator arm assembly including a TGA tail fitted between upper and lower elements of the arm assembly and fastened by a solder material, wherein the solder material is a high purity lead free alloy composed of $x=3\%$ to $4\%$ of silver, $y=0.5\%$ to $0.7\%$ of copper, and $z=100\%-(x+y)$ of tin.

2. The hard disk drive of claim 1, wherein the actuator stack includes no adhesive or epoxy.

3. The hard disk drive of claim 1, wherein the solder material is RoHS compliant.

4. The hard disk drive of claim 1, wherein the solder material is SAC357 or SAC 305.

5. The hard disk drive of claim 1, further comprising a sealed enclosure.

6. The hard disk drive of claim 5, wherein the sealed enclosure is filled with an inert gas.

7. The hard disk drive of claim 1, wherein the hard disk drive is a HAMR hard disk drive.

8. A method for bonding a plurality of actuator arm assemblies in an actuator stack, the method comprising, for each actuator arm assembly:

fitting a TGA tail between upper and lower elements of the arm assembly;

applying a solder material to a gap between the upper and lower elements of the arm assembly;

allowing the solder material to flow in a melted state; and allowing the solder material to cool and solidify, thereby forming a solder tack that bonds the TGA tail to the arm assembly, wherein the solder material is a high purity lead free alloy composed of $x=3\%$ to $4\%$ of silver, $y=0.5\%$ to $0.7\%$ of copper, and $z=100\%-(x+y)$ of tin.

9. The method of claim 8, wherein the solder material is applied in a molten state.

10. The method of claim 8, wherein the solder material is applied as a paste and then melted after being applied.

11. The method of claim 8, wherein fitting the TGA tail occurs before applying the solder material.

12. The method of claim 8, wherein fitting the TGA tail occurs after applying the solder material.

13. The method of claim 8, wherein fitting the TGA tail occurs while applying the solder material.

14. The method of claim 8, further comprising inspecting the solder tack to determine whether reworking the solder tack is necessary.

15. The method of claim 14, further comprising reworking the solder tack.

16. The method of claim 8, further comprising incorporating the actuator stack into a hard disk drive.

17. The hard disk drive of claim 1, wherein the solder material is the only material bonding the TGA tail between the upper and lower elements of the arm assembly.

18. The method of claim 8, wherein the solder tack is the only material bonding the TGA tail to the arm assembly.

* * * * *